(12) United States Patent
Andersson et al.

(10) Patent No.: US 8,943,644 B2
(45) Date of Patent: Feb. 3, 2015

(54) VACUUM CLEANER

(75) Inventors: Tommy Andersson, Kista (SE); Magnus Wennerström, Enköping (SE); Henrik Nygren, Ekerö (SE); Gunnar Lundmark, Kista (SE)

(73) Assignee: AB Electrolux (SE)

( * ) Notice: Subject to any disclaimer, the term of this patent is extended or adjusted under 35 U.S.C. 154(b) by 805 days.

(21) Appl. No.: 13/140,771

(22) PCT Filed: Nov. 5, 2009

(86) PCT No.: PCT/SE2009/000486
§ 371 (c)(1),
(2), (4) Date: Sep. 7, 2011

(87) PCT Pub. No.: WO2010/071534
PCT Pub. Date: Jun. 24, 2010

(65) Prior Publication Data
US 2011/0308037 A1 Dec. 22, 2011

Related U.S. Application Data

(60) Provisional application No. 61/138,783, filed on Dec. 18, 2008.

(30) Foreign Application Priority Data

Dec. 17, 2008 (SE) .................................. 0802592

(51) Int. Cl.
*A47L 9/10* (2006.01)
*A47L 9/00* (2006.01)
*B01D 45/16* (2006.01)

(52) U.S. Cl.
CPC ............... *A47L 9/0081* (2013.01); *B01D 45/16* (2013.01)
USPC .............. 15/327.2; 15/326; 15/327.6; 55/337

(58) Field of Classification Search
CPC ............ A47L 5/00; A47L 9/10; B01D 45/00; B01D 45/16
USPC ................. 15/326, 327.2, 327.6, 353; 55/337
IPC .................................................. A47L 5/00, 9/10
See application file for complete search history.

(56) References Cited

U.S. PATENT DOCUMENTS

2013/0031743 A1  2/2013 Hawkins et al.

FOREIGN PATENT DOCUMENTS

| EP | 1172059 A1 | 1/2002 |
|----|------------|--------|
| EP | 1 674 019  | 6/2006 |
| EP | 1 803 382  | 7/2007 |
| GB | 982 935    | 2/1965 |

*Primary Examiner* — David Redding
(74) *Attorney, Agent, or Firm* — RatnerPrestia

(57) ABSTRACT

The present disclosure relates to a vacuum cleaner comprising an electric motor 3 and a blower producing an air flow through the vacuum cleaner. The electric motor and the blower are placed on a common vertical axis 17. A separator unit 13 is placed laterally with respect to the common axis of the motor and the blower. A bent conduit 19 connects the blower with the separator unit, and one end 21 of the conduit encloses the common vertical axis. The conduit comprises a portion located along the common axis 17 having a double wall forming a closed air pocket 23. This provides damping of noise emitted by the blower/motor and which propagates in the opposite direction of the air flow.

17 Claims, 4 Drawing Sheets

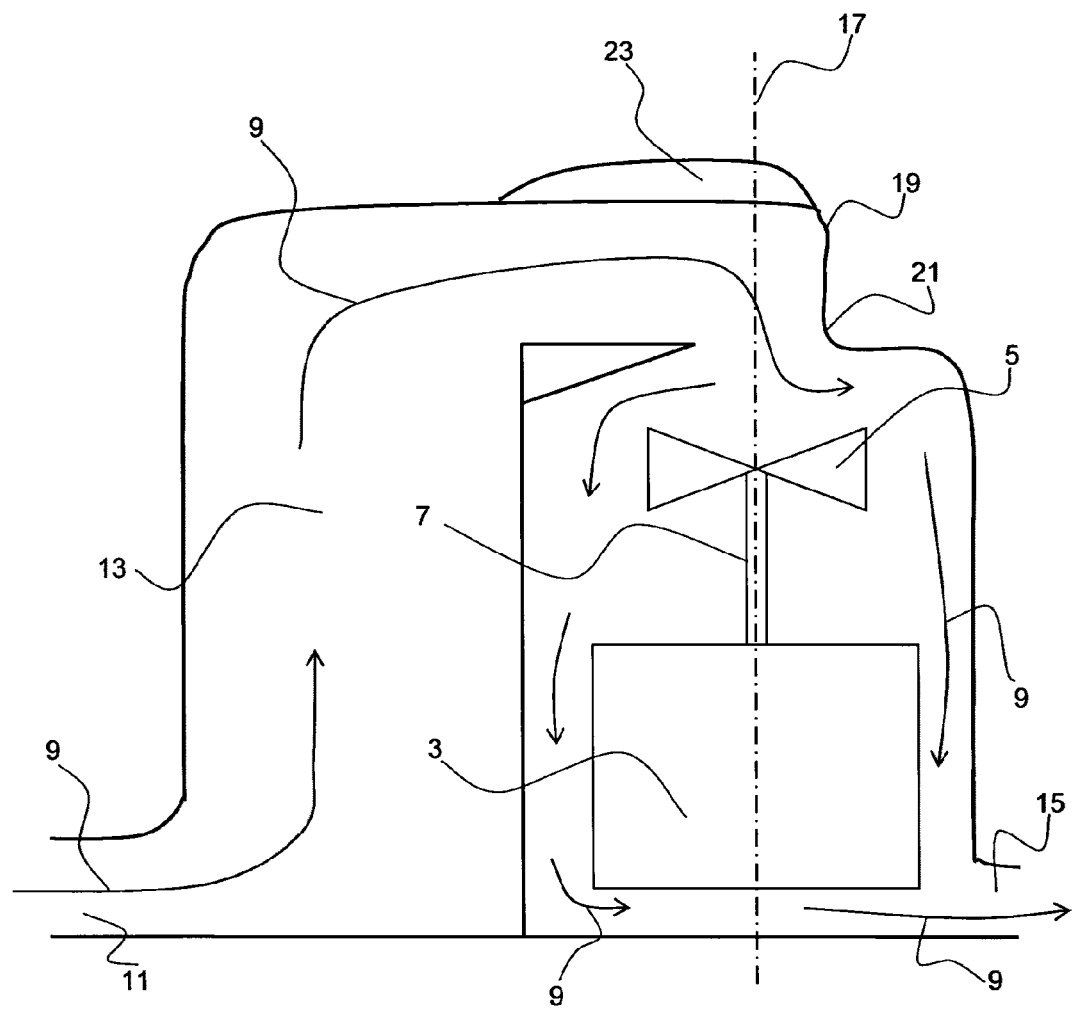

VACUUM CLEANER

This application is a U.S. National Phase application of PCT International Application No. PCT/SE2009/000486, filed Nov. 5, 2009 and claims priority to Swedish Patent Application No. 0802592-6 filed Dec. 17, 2008 and the benefit of U.S. Provisional Application No. 61/138,783 filed Dec. 18, 2008.

TECHNICAL FIELD

The present disclosure relates to a vacuum cleaner comprising an electric motor, a blower, connected to the electric motor to achieve an air flow, and a separator unit for separating dust from the air flow, the separator unit being connected to the blower, wherein the electric motor and the blower are placed on a common vertical axis.

BACKGROUND

Such a vacuum cleaner is disclosed for example, in EP-A1-1172059. In order to dampen noise from the motor/blower configuration of the vacuum cleaner, indentations with predetermined lengths are provided, which extend generally perpendicular to the noise propagation direction in an air flow passage. This arrangement requires that the depth of the indentations correspond to the frequencies of the generated noise. Such frequencies may however vary, for instance since the blower rotational speed may be changed by a varying load, thereby rendering the noise reduction difficult.

One problem associated with such vacuum cleaners is therefore to find alternative ways of reducing the emitted noise.

SUMMARY

In one aspect, embodiments of the present disclosure may provide a vacuum cleaner of the initially mentioned kind with noise reduction means that are operative over a greater acoustic bandwidth. This may be achieved by means of a vacuum cleaner as defined in claim 1. For example, a vacuum cleaner may have a separator unit which is placed laterally with respect to the common vertical axis of the motor and blower. A bent conduit connects the blower with the separator unit, and a first end of the conduit encloses the common vertical axis. The conduit comprises, a portion located along the common axis having a double wall forming a closed air pocket. This configuration may provide at least one bend of the air path, upstream of the blower, which makes the noise path longer. At the same time, the air pocket dampens noise that would otherwise escape from the main noise path. This arrangement has proved to provide excellent noise dampening characteristics.

In one embodiment, the closed air pocket may be formed between a first lid and a second lid, which are attached to the vacuum cleaner casing. A first seal may be placed in a groove in the casing, the groove also receiving a flange projecting from the second lid. Additionally, a second seal may be placed in a groove in the second lid, the groove also receiving one or more flanges which project from the casing.

The conduit may have the form of a flat chamber, extending between the first end at the blower and a second end at the separator unit. The chamber's cross section, as measured transverse to the common vertical axis, may widen or increase in the direction towards the separator unit. The midpoint of the conduit at the second end may be offset, transverse to the common vertical axis, from the midpoint at the first end, as seen from the separator unit. This may provide improved flow properties. Further improved properties may be achieved if the side walls of the conduit, leading from the first to the second end, both are bent such that they bulge in the direction in which the midpoint of the second end is offset in relation to the midpoint of the first end.

BRIEF DESCRIPTION OF THE DRAWINGS

FIG. 1 illustrates schematically a vacuum cleaner according to one embodiment of the present disclosure.

DETAILED DESCRIPTION

Figure 2:
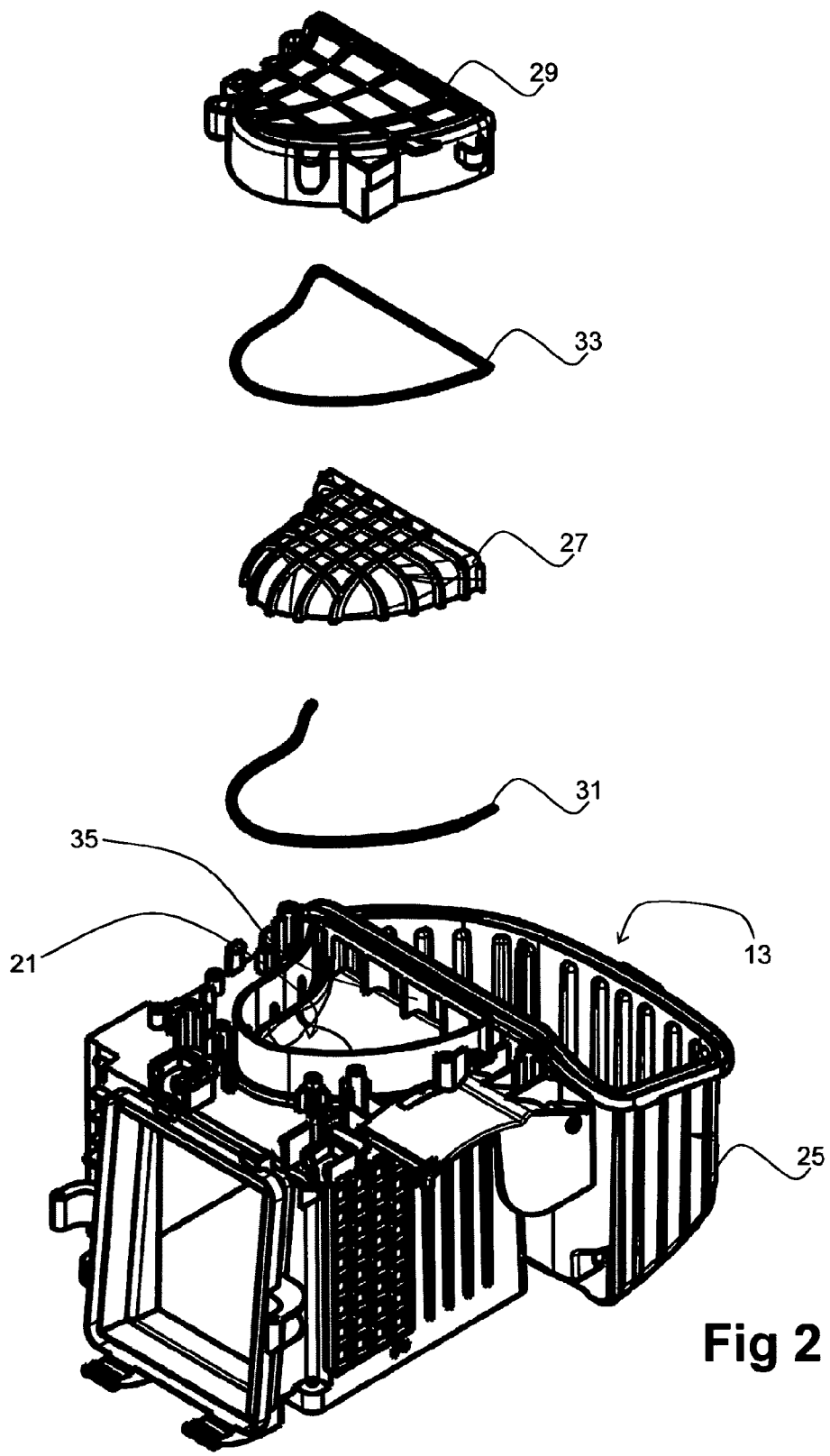
FIG. 2 shows an exploded view of a vacuum cleaner casing according to another embodiment of the present disclosure.

FIG. 1 illustrates schematically a vacuum cleaner 1 according to one embodiment of the present disclosure. The vacuum cleaner comprises an electric motor 3 and a blower 5, connected to the electric motor 3 by means of a shaft 7. As the electric motor 3 rotates the blower 5, an air flow 9 through the vacuum cleaner 1 is created.

Dust laden air is picked up by a nozzle (not shown) and conveyed to an inlet 11 to enter a separator unit 13. The separator unit 13 may be of the filter or cyclone type and separates dust from the air flow 9. The air flow 9 then passes at least the blower 5 and returns to the ambient air at an outlet 15.

The electric motor 3 and the blower 5 are placed on a common vertical axis 17, and the blower 5 may be placed above the electric motor 3. The separator unit 13 is placed laterally with respect to the common vertical axis 17. A conduit 19 connects the blower 5 and the electric motor 3 with the separator unit 13. One end 21 of the conduit 19 is located along the common vertical axis 17 of the blower-motor combination, and the conduit is bent to connect to the separator unit 13.

Noise generated by the blower 5 and the electric motor 3 is believed to propagate, to a great extent, in the reverse direction of the air flow 9. Using the laterally-positioned separator unit configuration, such as shown, the air flow 9 upstream the blower 5 bends a number of times which is expected to dampen the noise to some extent.

In order to further inhibit the generation of audible noise, the conduit 19 may have a portion with a double wall forming a closed air pocket 23 located along the common axis 17. This feature has proven to dampen, to a great extent, the noise that would otherwise escape through the conduit 19 where it bends from the common axis 17.

FIG. 2 shows an exploded view of an exemplary vacuum cleaner casing 25 and components making up the closed air pocket 23 of FIG. 1. The closed air pocket 23 may be created between a first, inner lid 27 and a second, outer lid 29. In order to make sure that the pocket is sealed from the ambient air, a first seal and a second seal 31, 33 may be placed between the second outer lid 29 and the casing 25, as can also be seen in FIG. 3. Returning to FIG. 2, the separator unit 13 is situated in the farther part of the casing 25 as seen in the perspective of the drawing. The inner volume of the conduit 19 (see FIG. 1) is created by the casing 25 and the inner lid 27. One end 21 of the conduit (hidden in FIG. 2, but shown in FIG. 1 or 3) is situated above the blower (not shown) and the other end 35 connects the conduit to the separator unit 13. The use of double lids is primarily intended to facilitate the production of a vacuum cleaner having a double-wall conduit. In the shown embodiment, it is not intended to allow the user to access the interior of the vacuum cleaner through the double lids, although that feature would be possible in alternative embodiments.

Figure 3:
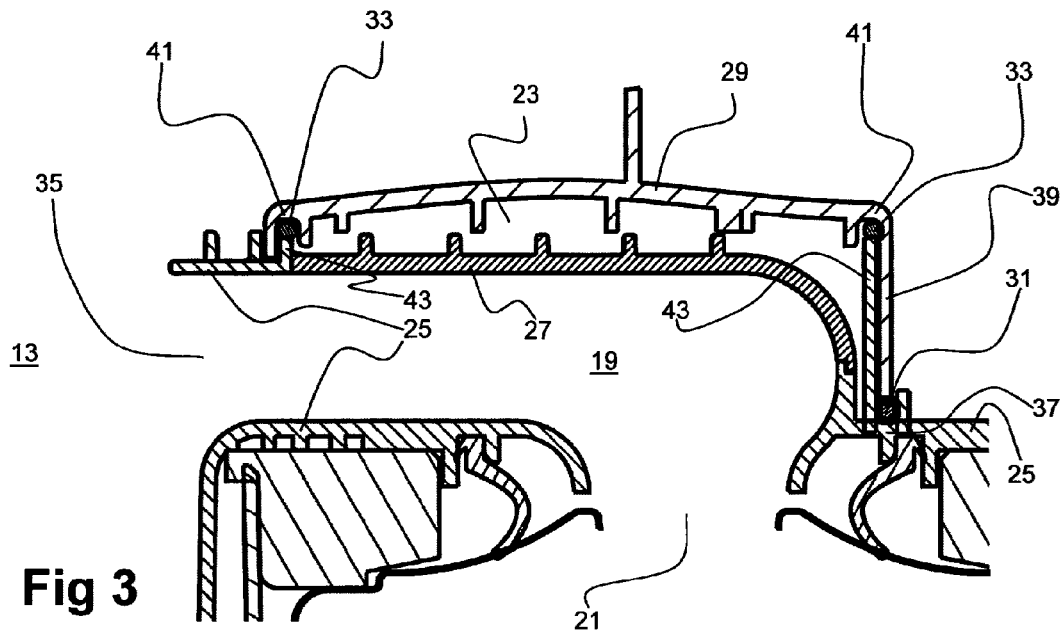
FIG. 3 is a cross section of a part of the vacuum cleaner casing of FIG. 2 shown assembled.

FIG. 3 is a cross section of the vacuum cleaner in FIG. 2, as shown when assembled. In this drawing, the separator unit 13 and the end 35 of the conduit 19 connected thereto are located to the left.

The first seal 31, which may be U-shaped with the open end facing towards the separator unit 13, may be placed in a groove 37 in the casing 25, the groove 37 receiving a flange 39, projecting from the second lid 29. The second seal 33 which may have a closed loop shape, may be placed in a groove 41 in the second lid 29. This groove receives one or more flanges 43 which project from the casing.

Both seals may be made of an elastic material such as silicon rubber.

The first, inner lid 27 is retained in place by the second, outer lid 29, together with the negative pressure generated in the conduit 19 interior by the blower 5.

Of course, fasteners may be used to hold the lids in place as well.

Figure 4:
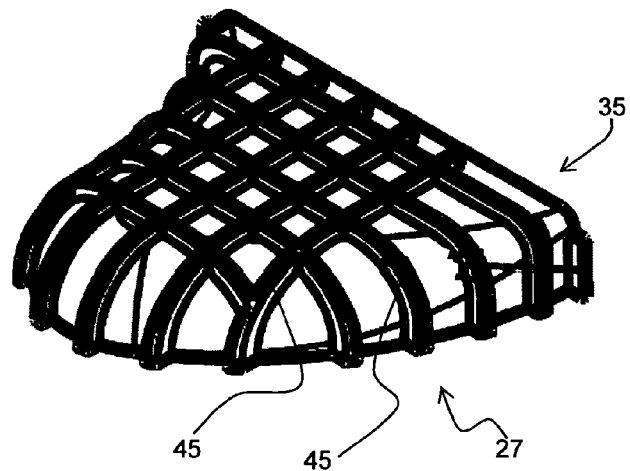
FIG. 4 shows an inner lid that may be used with embodiments of the present disclosure.

FIG. 4 shows an exemplary inner lid 27. As can be seen in the drawing, the inner lid may be stiffened by means of a plurality of reinforcement ribs 45 running across the surface thereof.

Figure 5:
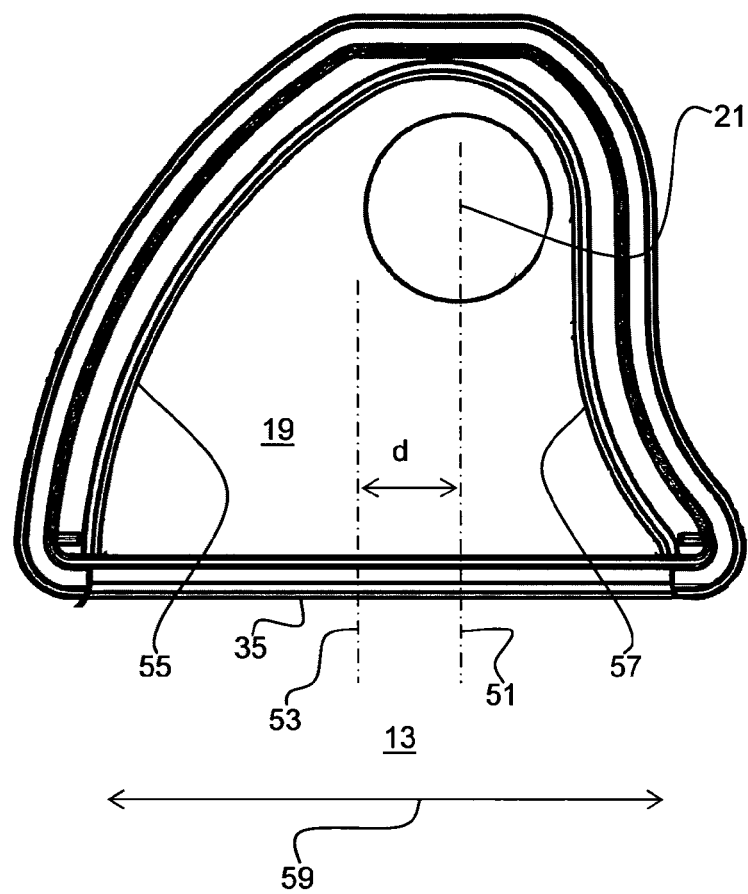
FIG. 5 illustrates a cross section of a conduit connecting a separator unit with a fan.

FIG. 5 illustrates a cross section of a conduit 19 connecting a separator unit 13 with a fan 5. The drawing shows the interior of the conduit 19 as viewed along the common axis 17 (see FIG. 1) of the blower and motor. The conduit 19 has a first end 21 enclosing the motor/blower axis 17 and a second end 35 facing the separator unit 13. Generally, the conduit 19 may have the form of a flat chamber, having a greater size transverse to the motor/-blower axis than the size parallel to the same. Further, the chamber may widen in the direction towards the separator unit 13, such that the width transverse to the motor/blower axis 17 becomes even greater towards the separator unit 13. At the second end 35, the width 59 may be several times the conduit width at the first end 21.

The midpoint 53 of the conduit at the second end 35 is offset a distance d (e.g. 2.5 cm) from the midpoint 51 at the first end 21, as seen from the separator unit 13. This asymmetric feature may provide improved airflow properties as it can, to a great extent, avoid the creation of two counter-acting vortices by the airflow. If only one dominating vortex is created, the airflow resistance is reduced.

This effect can be further enhanced if the side walls 55, 57 of the conduit 19, leading from the first 21 to the second opening 35, both are bent such that they bulge in the direction in which the midpoint 53 of the second opening 35 is offset in relation to the midpoint of the first opening 21.

As the person of ordinary skill in the art will realize, the above features for avoiding counter-acting vortices can be used in cases where a double-wall air-pocket 23 is not used, and vice-versa.

The present disclosure is not restricted to the above described examples and may be altered and varied in different ways within the scope of the appended claims.

The invention claimed is:

1. A vacuum cleaner comprising:
   a casing;
   an electric motor mounted within the casing;
   a blower mounted within the casing and connected to the electric motor to generate an air flow, the blower and the electric motor being aligned along a common vertical axis;
   a separator unit operatively associated with the casing and configured to separate dust from the air flow, the separator unit being laterally offset, relative to the common vertical axis, from the electric motor and the blower;
   a bent conduit fluidly connecting the separator unit to the blower, wherein a first end of the conduit extends over the common vertical axis; and
   wherein a portion of a wall forming the conduit located directly above the common vertical axis comprises a double wall connected by a seal to form a closed air pocket above the common vertical axis.

2. The vacuum cleaner of claim 1, wherein the closed air pocket is formed between a first lid and a second lid that are attached to the casing.

3. The vacuum cleaner of claim 2, wherein the casing comprises a first groove and the seal comprises a first seal in the first groove, and the second lid comprises a first flange that projects from the second lid and is received in the first groove.

4. The vacuum cleaner of claim 3, wherein the second lid comprises a second groove, and the seal comprises a second seal in the second groove, and the casing comprises one more second flanges that project from the casing and are received in the second groove.

5. The vacuum cleaner of claim 1, wherein the conduit comprises a flat chamber extending between the first end and a second end facing the separator unit, and wherein a cross-section of the chamber, as viewed in a plane transverse to the common vertical axis, widens in the direction towards the separator unit.

6. The vacuum cleaner of claim 5, wherein the first end of the conduit comprises a first opening that extends in transverse direction and the second end of the conduit comprises a second opening, and wherein a midpoint of the first opening along the transverse direction is offset, along the transverse direction, relative to a midpoint of the first opening.

7. The vacuum cleaner of claim 6, wherein the conduit comprises side walls leading from the first end to the second end, the sidewalls both being bent such that they bulge in the direction in which the midpoint of the second opening is offset in relation to the midpoint of the first opening.

8. A vacuum cleaner comprising:
   a casing;
   an electric motor mounted within the casing;
   a blower mounted within the casing and connected to the electric motor to generate an air flow, the blower and the electric motor being aligned along a common vertical axis;
   a separator unit operatively associated with the casing and configured to separate dust from the air flow, the separator unit being laterally offset, relative to the common vertical axis, from the electric motor and the blower;
   a conduit formed by a first lid connected to the casing, the conduit fluidly connecting the separator unit to the blower, wherein a first end of the conduit extends over the common vertical axis;
   a second lid connected to the casing and covering the first lid, wherein the second lid has the same general shape as the first lid as viewed along the common vertical axis, and
   a seal connecting the first lid to the second lid to form an enclosed air pocket between the second lid and the first lid.

9. The vacuum cleaner of claim 8, wherein the enclosed air pocket is positioned at least above the common vertical axis.

10. The vacuum cleaner of claim 8, wherein the casing comprises a first groove and the seal comprises a first seal in the first groove, and the second lid comprises a first flange that projects from the second lid and is received in the first groove.

11. The vacuum cleaner of claim 10, wherein the enclosed air pocket extends from the first end of the conduit to a second end of the conduit located adjacent the separator unit.

12. The vacuum cleaner of claim 10, wherein the second lid comprises a second groove, and the seal comprises a second seal in the second groove, and the casing comprises one more second flanges that project from the casing and are received in the second groove.

13. The vacuum cleaner of claim 8, wherein the conduit comprises a flat chamber extending between the first end and a second end facing the separator unit, and wherein a cross-section of the chamber, as viewed in a plane transverse to the common vertical axis, widens in the direction towards the separator unit.

14. The vacuum cleaner of claim 13, wherein the first end of the conduit comprises a first opening that extends in transverse direction and the second end of the conduit comprises a second opening, and wherein a midpoint of the first opening along the transverse direction is offset, along the transverse direction, relative to a midpoint of the first opening.

15. The vacuum cleaner of claim 14, wherein the conduit comprises side walls leading from the first end to the second end, the sidewalls both being bent such that they bulge in the direction in which the midpoint of the second opening is offset in relation to the midpoint of the first opening.

16. The vacuum cleaner of claim 8, wherein the conduit comprises a bent conduit.

17. A vacuum cleaner comprising:
a casing;
an electric motor mounted within the casing;
a blower mounted within the casing and connected to the electric motor to generate an air flow, the blower and the electric motor being aligned along a common vertical axis;
a separator unit operatively associated with the casing and configured to separate dust from the air flow, the separator unit being laterally offset, relative to the common vertical axis, from the electric motor and the blower;
a bent conduit fluidly connecting the separator unit to the blower, wherein a first end of the conduit extends over the common vertical axis;
wherein a portion of a wall forming the conduit located directly above the common vertical axis comprises a double wall forming a closed air pocket above the common vertical axis;
wherein the closed air pocket is formed between a first lid and a second lid that are attached to the casing; and
wherein the casing comprises a first groove and a first seal is positioned in the first groove, and the second lid comprises a first flange that projects from the second lid and is received in the first groove.

\* \* \* \* \*